United States Patent [19]

Biba et al.

[11] Patent Number: 4,521,891

[45] Date of Patent: Jun. 4, 1985

[54] MULTIPLE CHANNEL DATA COMMUNICATION SYSTEM

[75] Inventors: Kenneth J. Biba, San Francisco; Jose J. Picazo, Jr., San Jose, both of Calif.

[73] Assignee: Sytek, Incorporated, Mountain View, Calif.

[21] Appl. No.: 352,894

[22] Filed: Feb. 26, 1982

Related U.S. Application Data

[62] Division of Ser. No. 166,384, Jul. 7, 1980, Pat. No. 4,365,331.

[51] Int. Cl.³ .............................................. H04B 1/38
[52] U.S. Cl. ............................................ 375/8; 375/81
[58] Field of Search ............... 375/8, 9, 82, 95, 81; 179/2 DP; 455/87; 328/109, 135; 329/605, 107; 340/347 DA

[56] References Cited

U.S. PATENT DOCUMENTS

| | | | |
|---|---|---|---|
| 3,524,075 | 8/1970 | Matthews et al. | 328/135 X |
| 3,899,637 | 8/1975 | Willard et al. | 375/9 X |
| 3,931,575 | 1/1976 | Amoroso, Jr. | 455/87 X |
| 4,229,827 | 10/1980 | Bowman | 375/8 X |
| 4,254,504 | 3/1981 | Lewis et al. | 455/87 X |
| 4,267,595 | 5/1981 | Hernandez | 375/95 |
| 4,322,850 | 3/1982 | Antonini et al. | 375/82 X |
| 4,331,941 | 5/1982 | Kovalick et al. | 455/116 |

Primary Examiner—Robert L. Griffin
Assistant Examiner—Stephen Chin
Attorney, Agent, or Firm—Thomas E. Schatzel

[57] ABSTRACT

A multiple channel communications system and method for communication among multiple channels using a channel selectable MODEM. The system is comprised of a coaxial cable, a variety of interface units with attached communicating devices and a channel bridge. The interface units include a MODEM and a microprocessor based support element adapted for the attached communicating device. The channel bridge includes two or more MODEMs and a microprocessor based computer for receiving data from one MODEM and transmitting the data on another MODEM.

14 Claims, 16 Drawing Figures

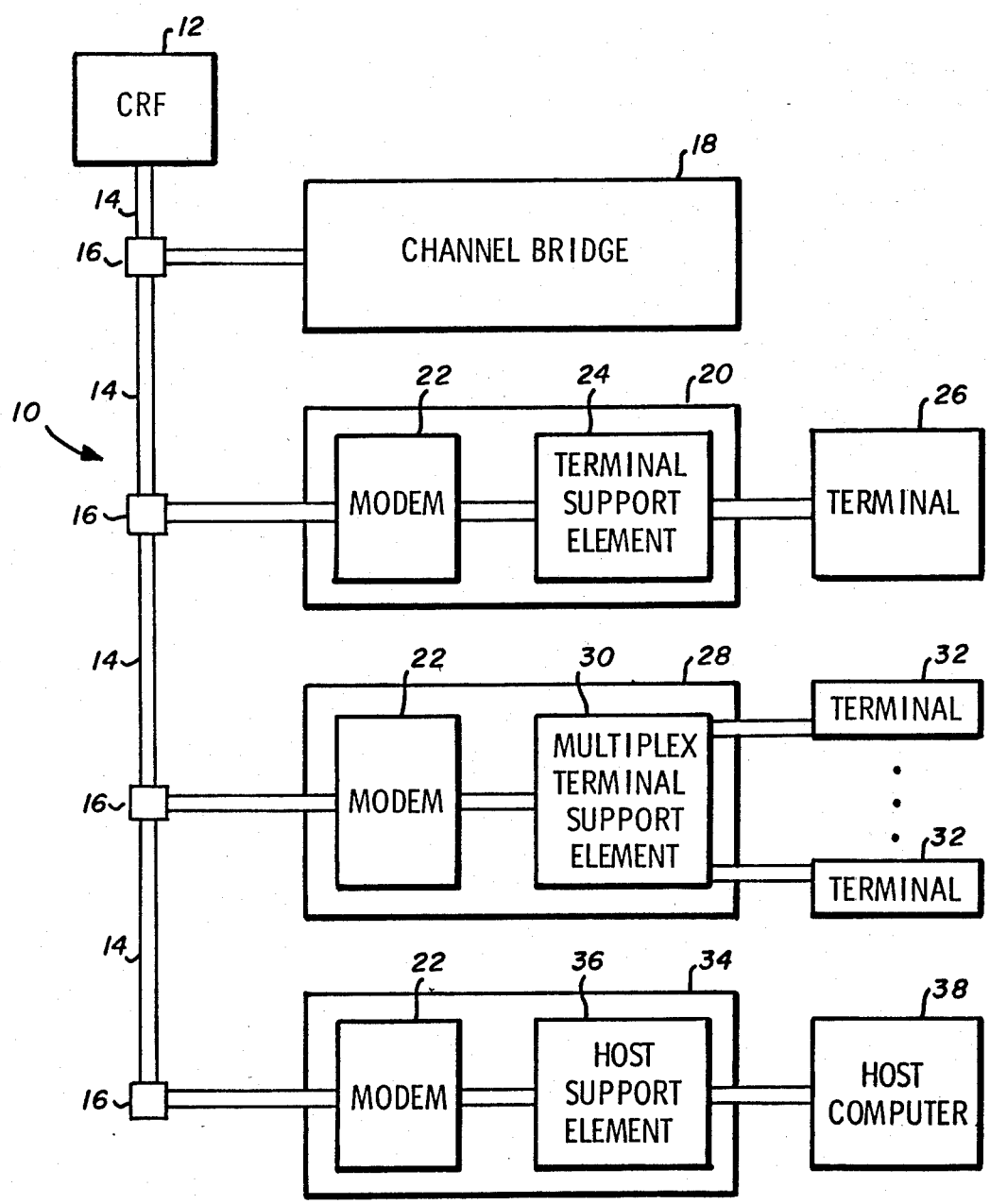
Fig_1

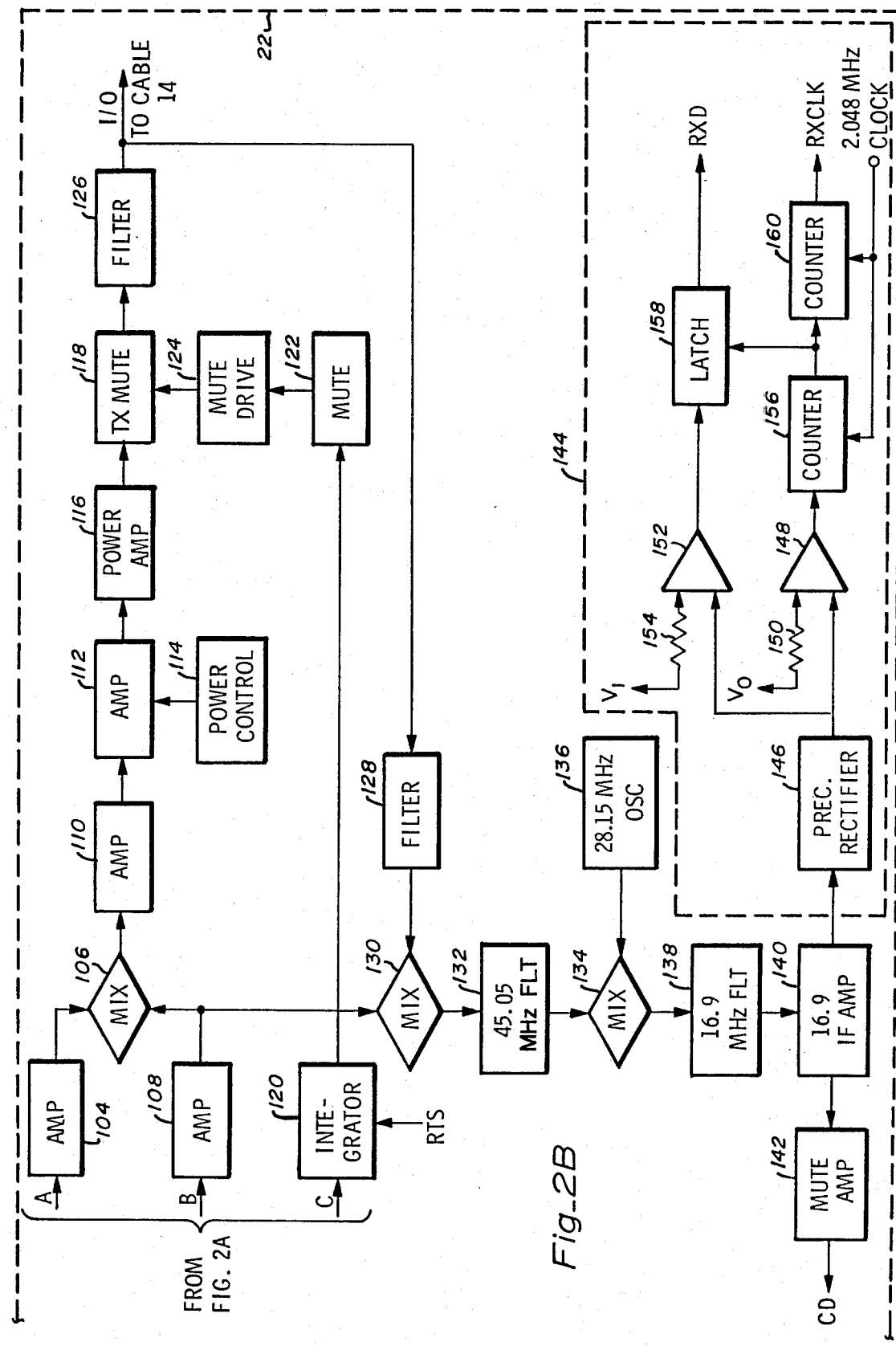
Fig._2B

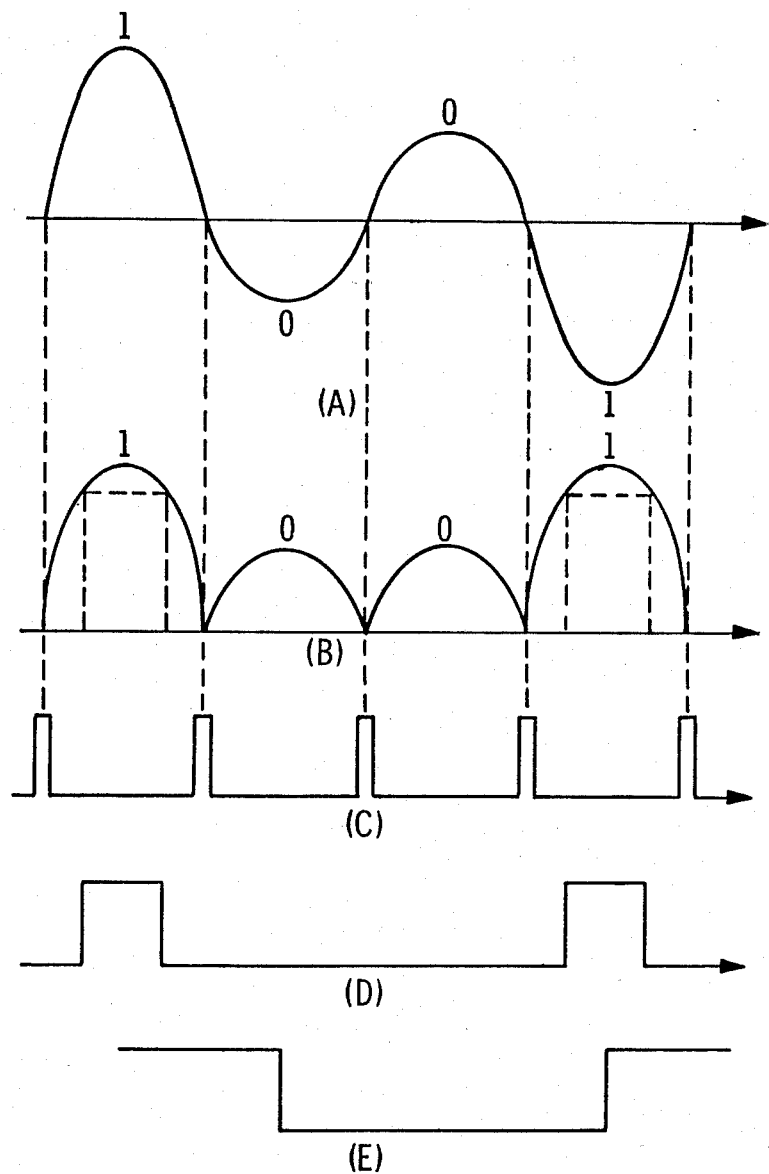
Fig_3

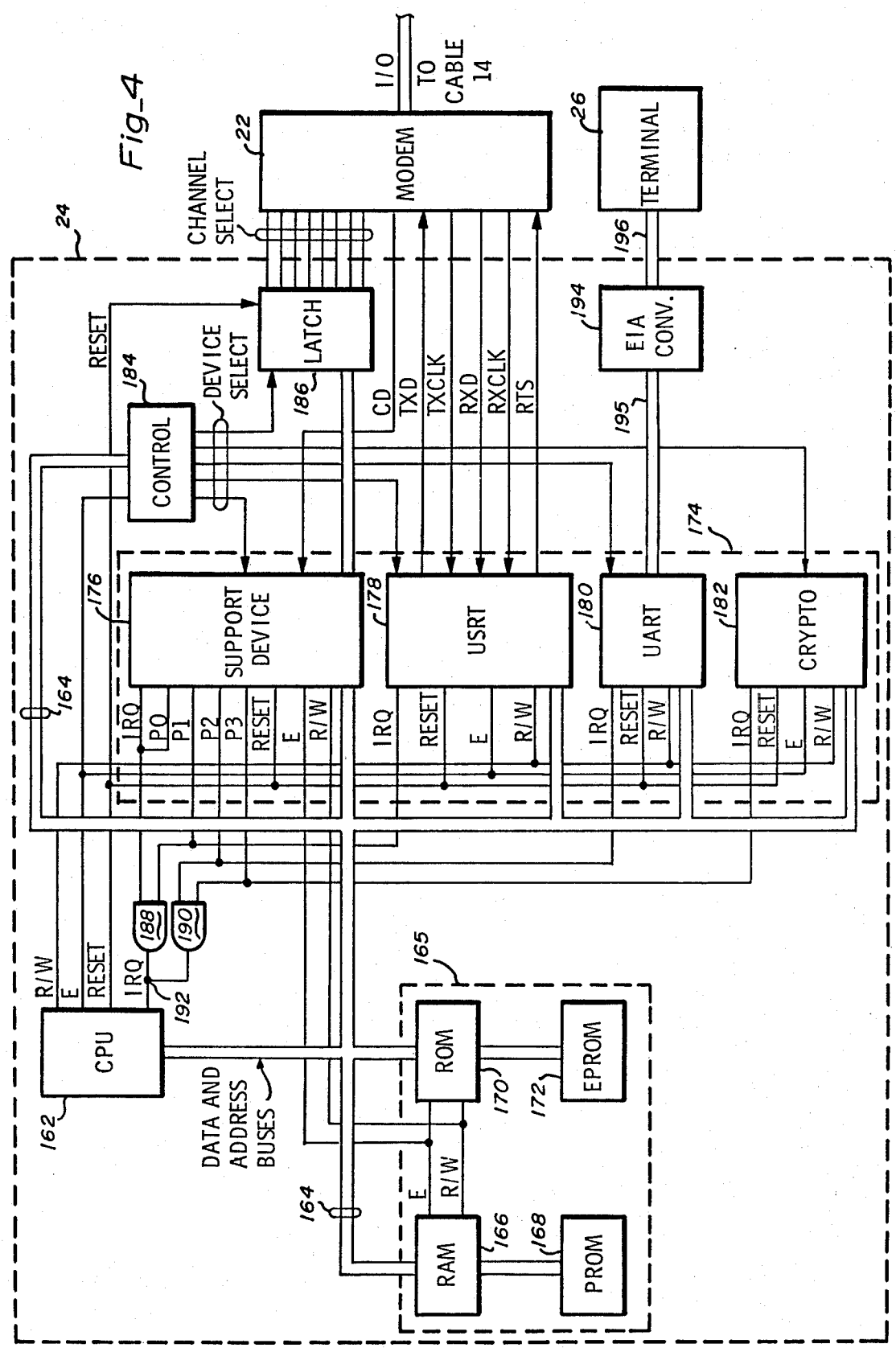

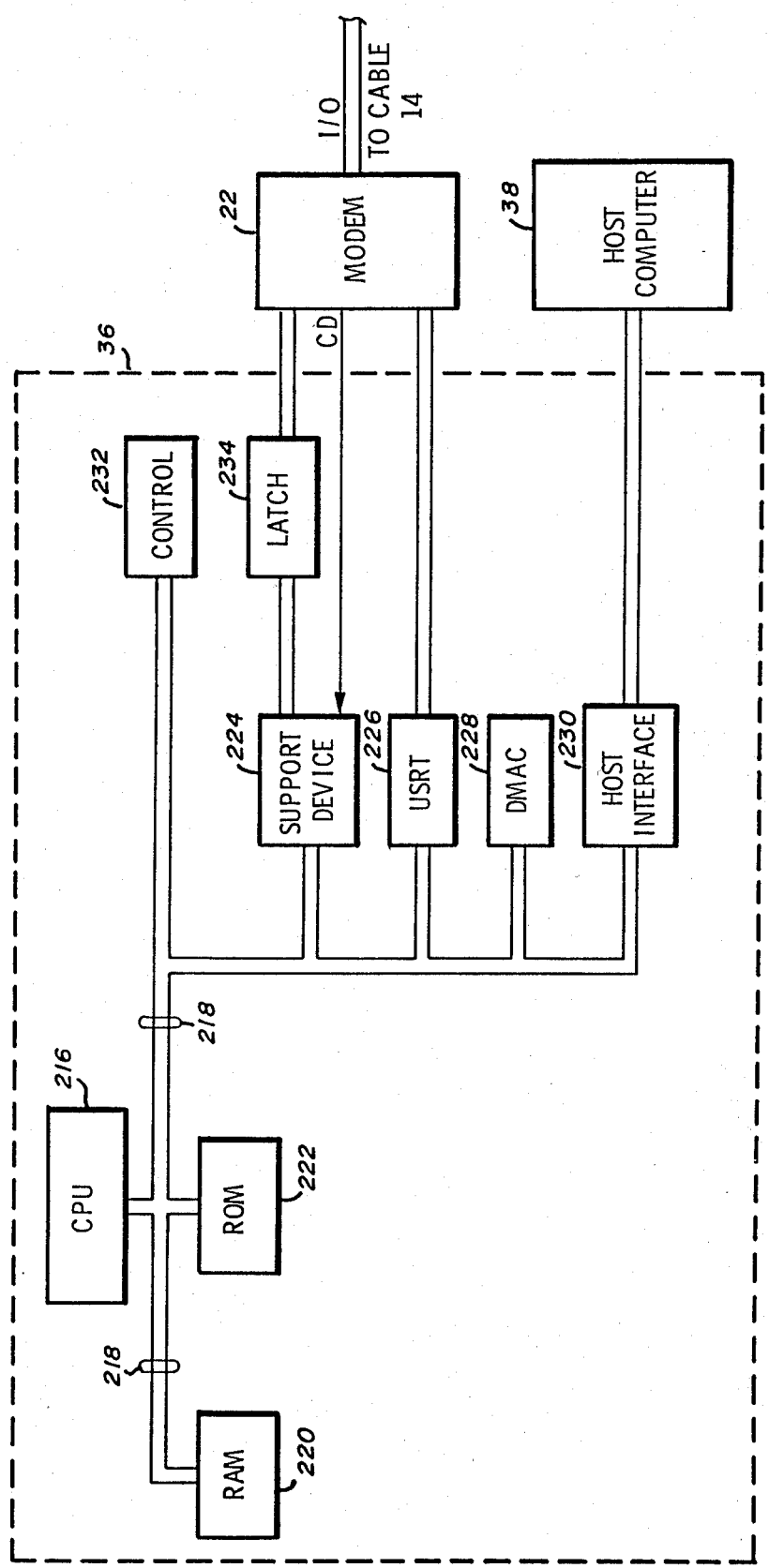
Fig_6

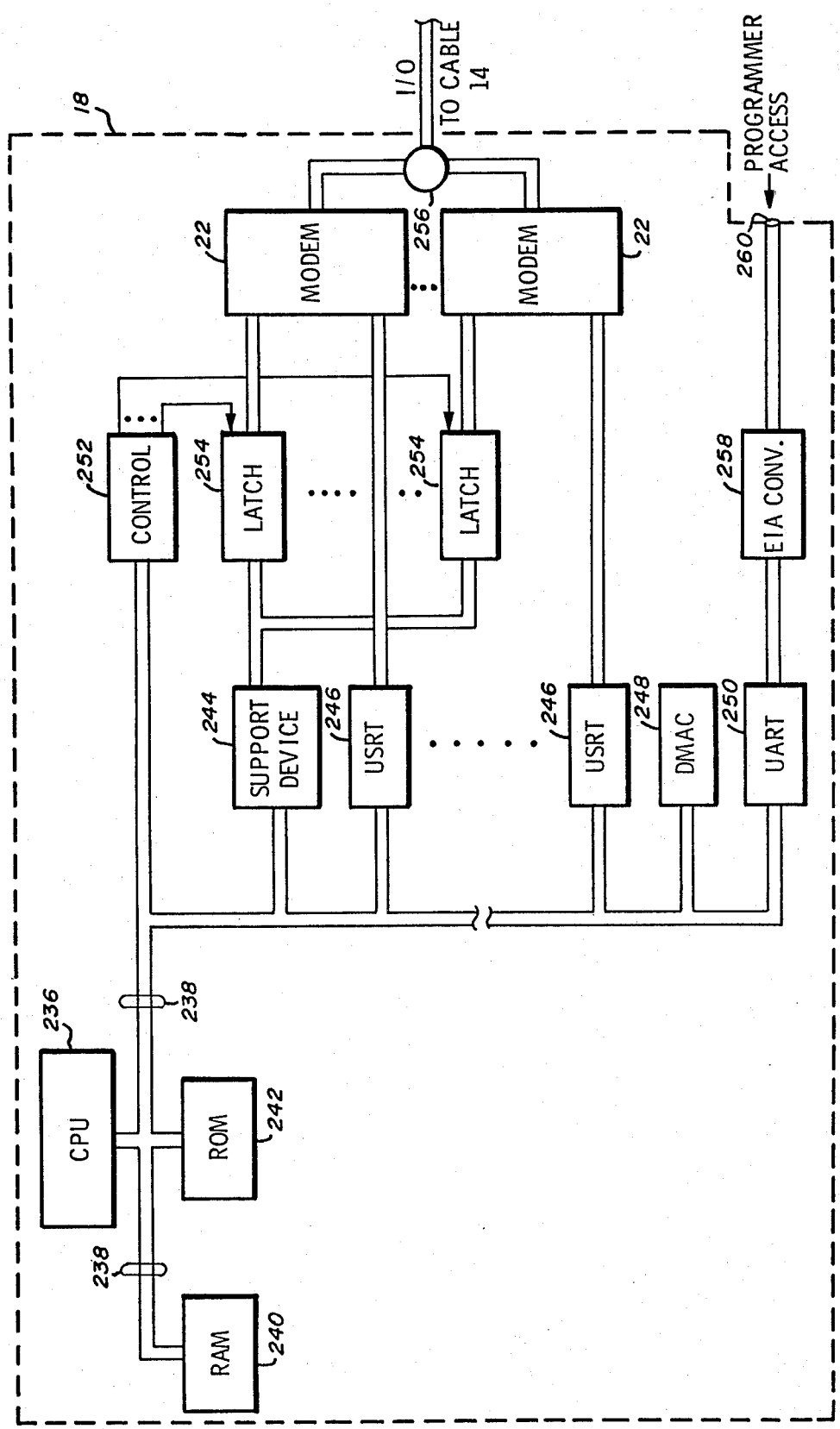
Fig_7

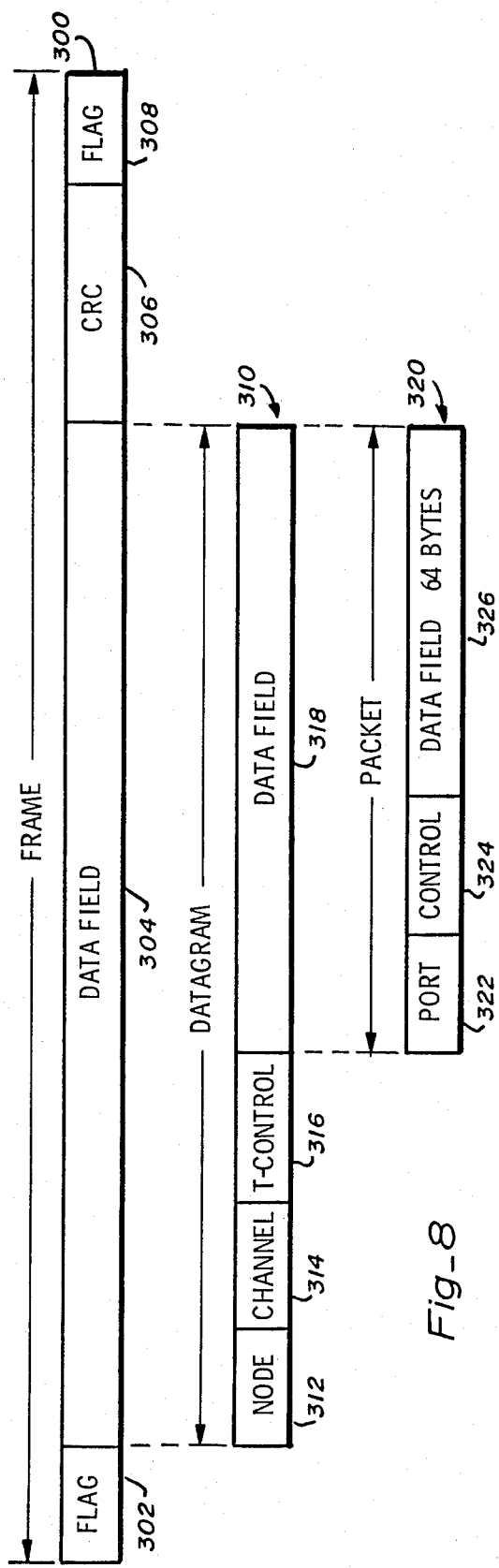
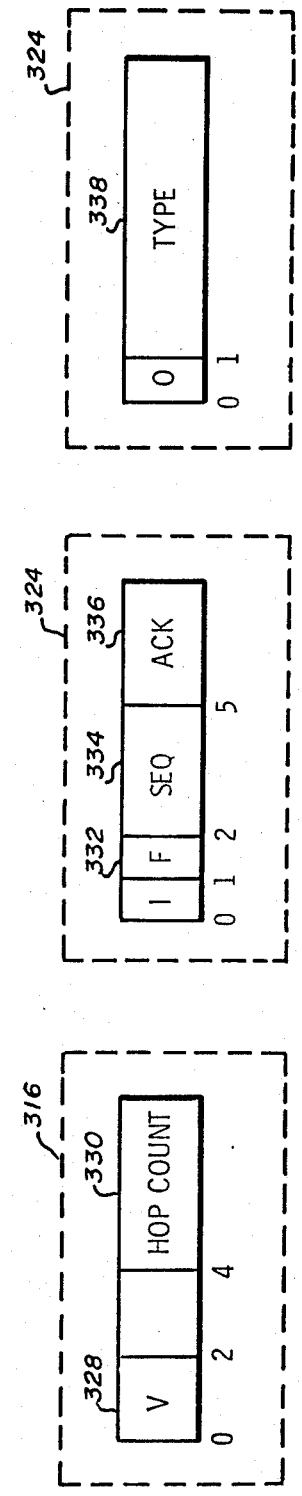
Fig_8
Fig_8A
Fig_8B
Fig_8C

MULTIPLE CHANNEL DATA COMMUNICATION SYSTEM

This is a division of application Ser. No. 166,384, filed July 7, 1980 now U.S. Pat. No. 4,365,331.

BACKGROUND OF THE INVENTION

1. Field of the Invention

The invention relates generally to data communication systems and more particularly to a data communication system for broadband coaxial cable which supports a plurality of communication channels.

2. Description of the Prior Art

Data communication is the transfer of digital information from one point to another, usually between a user terminal and a computer. In more sophisticated systems communication may take place between two computers, a computer and a remote printer or between combinations of computers, memory devices, terminals, or microprocessors used to control various devices, e.g. burglar alarms, to traffic controls, industrial operations, etc. Data is transmitted through a communication channel by a transceiver, sometimes referred to as as MODEM. Generally, the channel composes a pair of wires but can also assume other forms, e.g. radio frequency channels, microwave transmission channels, or optical fibers. In many applications a channel has a device at each end such as a computer connected to a terminal by a pair of wires. Data communication is also possible where there are more than two devices communicating on a channel.

When more than two using devices are connected to a single communication channel there are two methods of data communication. The first method is to assign time slots to the using devices connected to the channel. A using device may then transmit data during its time slot and must wait until the next cycle to transmit again. This method is known as "time division multiple access." The second method of communication allows any using device to transmit data when the communication channel is not being used by another device. This method of communication is referred to as "carrier sense multiple access (CSMA)."

A problem encountered with CSMA communication systems is that data collision occurs when two devices begin to transmit data at the same time. A signal sent by one transceiver will reach another transceiver a short time later, thus during the interim a second transceiver may begin transmitting a signal. The two signals will collide causing the data to be garbled.

Several methods have been developed for collision detection. One method, described in U.S. Pat. No. 4,063,220, granted to Metcalfe, et al., is to compare concurrently the cable contents bit by bit against the locally transmitted contents. If a difference is detected the transmission is aborted. Another method uses a looped cable where a signal is transmitted on an inbound cable and received on an outbound cable. A transceiver will receive its own transmission after the propagation delay of the cable. Once the entire transmission is received it is then compared to the transmitted signal to determine if the data has collided with another transmission. This method is inefficient in that a collision is not detected until the entire transmission is received.

When a collision has been detected by one of the above means the transceiver stops transmitting and backs off before retransmitting the same data. In order that both transceivers do not restart transmission at the same time the backoff time is determined either randomly or by a predetermined unique time interval.

In the prior art, data communication systems for coaxial cable have been limited to communication on a single channel. A channel is characterized by its position within the spectrum available (frequency) and the space it requires (bandwidth). Baseband coaxial cable has long been used for data communications. However, due to its physical characteristics only one communication channel is practical. Broadband (or CATV) coaxial cable has been used less frequently for data communication although it has long been used for cable television. The use of broadband coaxial cable for data communication is discussed in the article "Broadband Technology Magnifies Local Networking Capability" appearing in Data Communications, Vol. 9, No. 2, February, 1980. On broadband cable a broader frequency spectrum is available for transmission thus it is possible to divide the spectrum into frequency bandwidths which can be used for separate channels.

Information is communicated by a MODEM. MODEMs for use on broadband cable must be designed to transmit signals only in the frequencies of the channel to which it is assigned. Otherwise, it will cause interference on the other channels. Data is encoded by modulation which is accomplished by a variety of techniques. A problem encountered with modulation is that signals outside the bandwidth of the designated channel are generated. Therefore, it has been necessary to use filters. Filters add greatly to the expense of a transceiver and limit the transceivers operation to a designated channel. Thus, in the priot art, MODEMs for data communication over coaxial cable have been limited to operation on a single communication channel.

SUMMARY OF THE PRESENT INVENTION

It is therefore an object of the present invention to provide a data communication system with increased data communication capacity through use of multiple communication channels on a broadband coaxial cable.

It is a further object to provide a data communication system modem which is inexpensive and capable of programmable channel selection.

It is a further object to provide a data communication system with the capability of communication between communication channels on a cable.

It is a further object to provide a data communication system capable of operating on existing CATV coaxial cable installations.

It is a further object to provide a data communication system with improved collision detection.

Briefly, in the preferred embodiment, a data communication system of the present invention includes a broadband coaxial cable which serves as the communication medium. Connected to the cable are a plurality of MODEMs which are channel selectable. Connected to the MODEMs are interfaces for controlling access to the cable and for supplying data to and receiving data from a using device. Also included is a bridge between channels whereby a transmission on one channel may be rebroadcast on another channel.

An advantage of the data communication system of the present invention is that the data communication capacity for broadband coaxial cable is increased through the use of multiple communication channels.

Another advantage is that the MODEM may be produced at low cost and is capable of programmable channel selection.

A further advantage is the capability to communicate data between communication channels on a cable.

A further advantage is that the data communication system of the present invention may be installed on existing CATV coaxial cable networks thereby reducing the cost of installing a system.

A further advantage is that improved collision detection is provided.

These and other objects and advantages will no doubt become apparent to those skilled in the art after having read the following detailed description of the preferred embodiment which is illustrated in the several figures of the drawings.

IN THE DRAWINGS

FIG. 1 is a block diagram of an embodiment of a data communication system of the present invention;

FIG. 2 (comprising two sheets marked 2A and 2B) is a block diagram of an embodiment of a MODEM of the system of FIG. 1;

FIGS. 3(A–E) are waveform diagrams illustrating various input and output signals of a data decoder of the MODEM of FIG. 2;

FIG. 4 is a block diagram of the terminal support element of the system of FIG. 1;

FIG. 6 is a block diagram of the host support element of the system of FIG. 1;

FIG. 7 is a block diagram of the channel bridge of the system of FIG. 1;

FIG. 8 is a diagram illustrating the contents and format of a data frame in accordance with the present invention; and FIGS. 8(A–C) illustrate the contents of various fields of the data frame of FIG. 8.

DETAILED DESCRIPTION OF THE PREFERRED EMBODIMENT

Figure 2A:
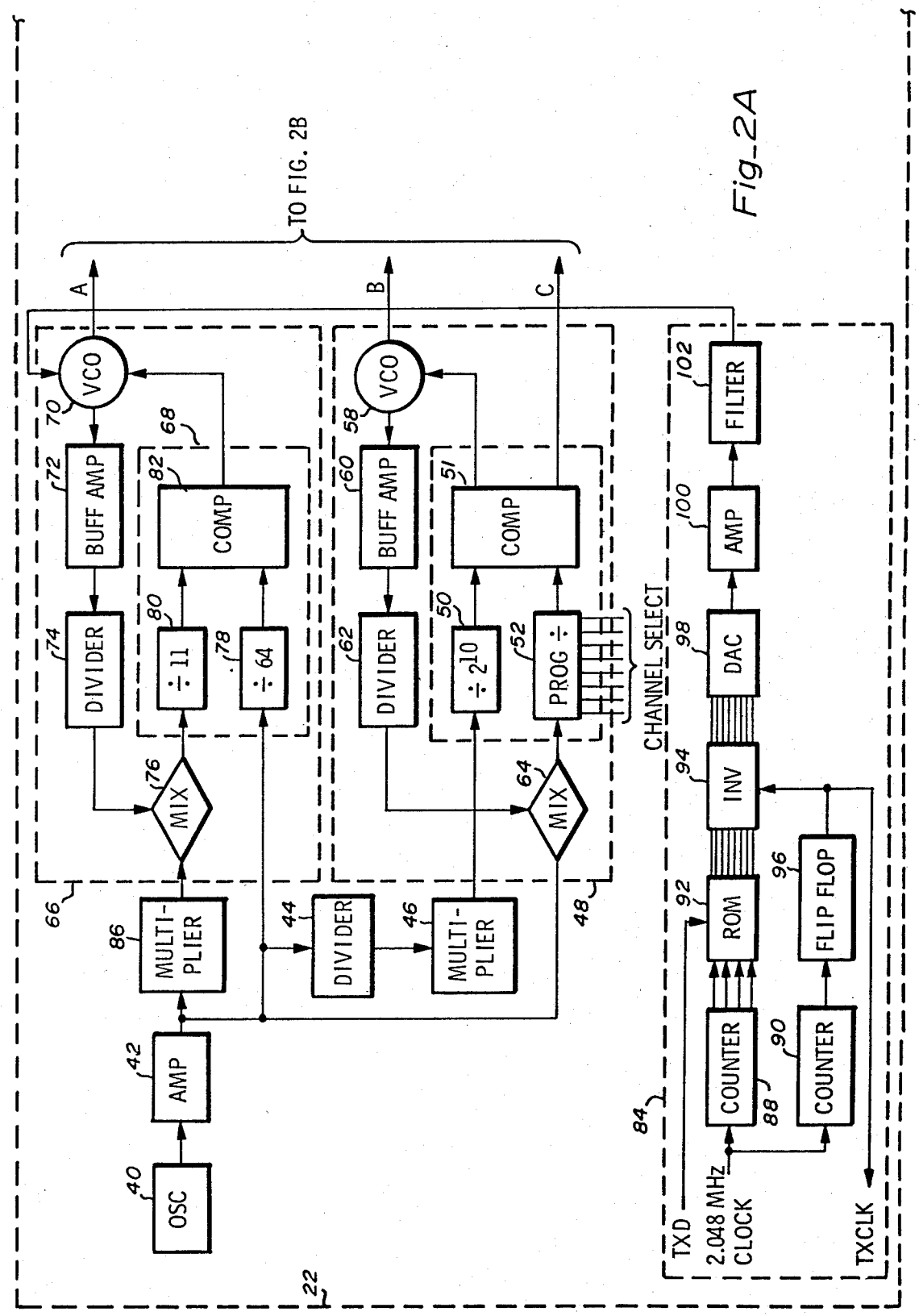

Referring to FIG. 1, there is illustrated a block diagram of a data communication system in accordance with the present invention and referred to by the general reference numeral 10. The data communication system 10 includes a central retransmission facility 12 connected at the head-end of a mid-split or sub-split broadband coaxial cable 14. The central retransmission facility 12 is a standard product available commercially such as manufactured by American Modem. The coaxial cable 14 is split by a plurality of unidirectional taps 16. The unidirectional taps 16 are a standard product in the cable television industry. The taps 16 are adapted to block transmission from a device connected to the tap of a signal in the receive frequency bandwidth of the system 10.

The data communication system 10 further includes a channel bridge 18. The channel bridge 18 is connected to the cable 14 at one of the unidirectional taps 16.

The data communication system 10 also includes a terminal interface 20. The terminal interface 20 includes a MODEM 22 and a terminal support element 24 connected to the associated MODEM 22. The terminal interface 20 is connected to the coaxial cable 14 between the MODEM 22 and another of the unidirectional taps 16. The terminal interface 20 is connected to a user terminal 26 at the terminal support element 24.

The data communication system 10 also includes a multiplex terminal interface 28. The multiplex terminal interface 28 includes another of the MODEMs 22 and a multiplex terminal support element 30 connected to the associated MODEM 22. The multiplex terminal interface 28 is connected to the cable 14 between the MODEM 22 and another of the unidirectional taps 16. The multiplex terminal interface 28 is connected to a plurality of user terminals 32 at the multiplex terminal support element 30.

The data communication system 10 also includes a host computer interface 34. The host computer interface 34 includes another of the MODEMs 22 and a host support element 36 connected to the associated MODEM 22. The host computer interface 34 is connected to the cable 14 between the MODEM 22 and another of the unidirectional taps 16. The host computer interface 34 is connected to a host computer 38 at the host support element 36.

FIG. 2 is a block diagram of the MODEMs 22. The MODEMs 22 of FIG. 1, all of which are identical, includes a temperature compensated 10.24 MHz oscillator 40. The output of the oscillator 40 is fed to an amplifier 42. The output of the amplifier 42 is fed to a divider 44. The divider 44 divides the input frequency by two, thus providing a 5.12 MHz output. The output of the divider 44 is fed to a multiplier 46. The multiplier 46 multiplies the input frequency by five, thus providing a 25.6 MHz output.

The output of the multiplier 46 is fed to a main phase lock loop circuit 48. The multiplier 46 output is connected to a frequency divider 50, which is tied to a phase comparator 51. The comparator 51 is also tied to a programmable divider 52. The divider 50 divides the input signal from the multiplier 46 by a factor of 1024, thus providing a fixed 25 KHz output. The programmable divider 52 has eight channel select inputs which are provided by the terminal support element 24, the multiplex terminal support element 30 or the host support element 36. The binary value of the channel select input determines the divisor of the programmable divider 52. The input to the programmable divider 52 is provided by the feedback loop of the main phase lock loop circuit 48 further hereafter described. The outputs of the divider 50 and the programmable divider 52 are fed to the phase comparator 51. In manufacture, the fixed divider 50, programmable divider 52 and comparator 51 may all be part of a common semiconductor circuit chip.

The feedback loop of the main phase lock loop circuit 48 includes a voltage controlled oscillator 58, a buffer amplifier 60, a divider 62 and a mixer 64. An output of the phase comparator 51 is connected to the voltage controlled oscillator 58. The output of the voltage controlled oscillator 58 is fed to the buffer amplifier 60. The output of the buffer amplifier 60 is fed to the divider 62 which divides the input signal by ten. The output of the divider 62 is fed to the mixer 64 which also has a 10.24 MHz input signal source from the amplifier 42. The output of the mixer 64 is a signal having a frequency equal to the difference of the frequencies of the inputs and is fed to the programmable divider 52.

The operation of the main phase lock loop circuit 48 is as follows. The oscillator 40 provides a fixed frequency input to the phase lock loop circuit 48. The output of the divider 50 is a fixed 25 KHz signal. This signal is compared to the output of the programmable divider 52 by the phase comparator 51. The voltage controlled oscillator 58 produces a signal having a frequency controlled by the voltage of the input from the comparator 51. When the output frequency of the programmable divider 52 varies from 25 KHz the phase comparator 51 will adjust the voltage of the signal fed to the voltage controlled oscillator 58 until the frequency of the output from the programmable divider 52 is 25 KHz at which point the loop is locked and the output of the voltage controlled oscillator 58 is a fixed frequency.

The relationship between the frequency of the output of the voltage controlled oscillator 58 and the binary value of the channel select input of the programmable divider 52 is represented by the following equation:

$$F_o = N(250 \times 10^3) + (102.4 \times 10^6)$$

where $F_o$ is the output frequency of the voltage controlled oscillator 58 and N is the value of channel select input.

The signal from the oscillator 40 is also fed to a transmit phase lock loop circuit 66 connected to the output of the amplifier 42. The transmit phase lock loop circuit 66 includes a transmit phase lock loop block 68, a voltage controlled oscillator 70, a buffer amplifier 72, a divider 74 and a mixer 76. Within the transmit phase lock loop block 68 is a divider 78, a divider 80 and a phase comparator 82 which in manufacture may all be part of a common semiconductor circuit chip.

The output of the amplifier 42 is fed to the input of the divider 78 which is adapted to divide the input frequency by sixty-four. The output of the divider 78 is fed to the phase comparator 82. The divider 80 receives the feedback signal of the transmit phase lock loop circuit 66. The divider 80 divides the input frequency by eleven and feeds the output signal to the phase comparator 82. The output of the phase comparator 82 is fed to the voltage controlled oscillator 70. The voltage controlled oscillator 70 also receives an input from a data encoder network 84. The output of the voltage controlled oscillator 70 is fed to the buffer amplifier 72, the output of which is fed to the divider 74. The divider 74 divides the input frequency by five and its output is fed to the mixer 76. The output of the amplifier 42 is also fed to a multiplier 86 adapted to multiply the input frequency by two. The output of the multiplier 86 is also fed to the mixer 76. The mixer 76 will provide an output signal with a frequency equal to the difference of the frequencies of the inputs from the multiplier 86 and divider 74.

The data encoder network 84 includes a counter 88, a counter 90, a read only memory (ROM) 92, an inverter 94, a flip-flop 96, a digital to analog converter 98, an amplifier 100 and a filter 102. The counter 88 is tied to a 2.048 MHz clock input source which is also fed to the counter 90. The counter 88 has four output lines which represent a binary value that is incremented by one for each clock pulse. When the binary value of the output from the counter 88 is fifteen the next clock pulse will cause the output to be "0". The counter 90 is adapted to produce an output pulse every sixteenth clock pulse.

The four outputs of the counter 88 are fed to the read only memory 92. The read only memory 92 is also connected to receive a transmit data input (TXD) which is provided by the terminal support element 24, the multiplex terminal support element 30 or the host support element 36. The transmit data input provides the digital data which is to be encoded by the data encoder 84 and eventually transmitted by the MODEM 22. The inputs to the read only memory 92 provide the address to a memory location. When a memory location is addressed the contents of that memory location will be output from the read only memory 92.

The output of the read only memory 92 is fed to an inverter 94. The counter 90 also provides an output pulse to the flip-flop 96 which provides an output that changes with each pulse from the counter 90. The output of the flip-flop 96 is fed to the inverter 94. The inverter 94 will output the complement of the input from the read only memory 92 when the input from the flip-flop 96 is a logical "1" and will not output the complement when it is a logical "0".

The output of the inverter 94 is fed to the digital-to-analog converter 98. The digital-to-analog converter 98 outputs a voltage which is selected by the digital inputs from the inverter 94. The output of the digital-to-analog converter is fed to the amplifier 100 the output of which is fed to the filter 102.

The output of the digital to analog converter 98 is an amplitude modulated signal. The amplitude of a half cycle is selected by the transmit data input (TXD) to the read only memory 92. If the transmit data input is a logical "1" then a memory bank is addressed that produces outputs that will cause the digital to analog converter 98 to produce a half cycle signal having an amplitude corresponding to a logical "1". A transmit data input of logical "0" will address a memory bank corresponding to logical "0". The inverter 94 causes every other half cycle from the digital-to-analog converter 98 to be inverted. Thus, the digital transmit data input (TXD) into the data encoder 84 is converted to an amplitude modulated signal with two bits of data per cycle. The output of the flip-flop 96 provides a transmit clock and is fed to the terminal support element 24, the multiplex terminal support element 30 or the host support element 36. The transmit clock tells the support element 24, 30 or 36 when to output the next bit of data.

The amplitude modulated signal from the data encoder network 84 is fed to the voltage controlled oscillator 70 of the transmit phase lock loop circuit 66. The output of the voltage controlled oscillator 70 thus will be a frequency modulated signal with a center frequency generated by the transmit phase lock loop circuit 66. The center frequency generated by the transmit phase lock loop circuit 66 is 111.2 MHz.

The output signal from the transmit phase lock loop circuit 66 is fed to an amplifier 104. The output of the amplifier 104 is fed to a mixer 106. The output of the main phase lock loop circuit 48 from the voltage controlled oscillator 58 is fed to an amplifier 108. The output of the amplifier 108 is also fed to the mixer 106. The mixer 106 produces an output signal having a frequency equal to the difference of the frequencies of the inputs. Thus, the transmit frequency at the output of the mixer 106 will be a function of the channel select input of the programmable divider 52.

The output of the mixer 106 is fed to an amplifier 110. The output of the amplifier 110 is fed to a second amplifier 112. The second amplifier 112 also receives an input from a power control circuit 114. The output of the amplifier 112 is fed to a power amplifier 116 the output of which is then fed to a transmit mute 118.

An integrator 120 has an input connected to the phase comparator 51 and a request to send input from the terminal support element 24, the multiplex terminal support element 30 or the host support element 36. The output of the integrator 120 is fed to a mute 122. The output of the mute 122 is fed to a mute drive 124 the output of which is fed to the transmit mute 118. When the main phase lock loop circuit 48 is not in a locked state the phase comparator 51 will provide an output to the integrator 120. The main phase lock loop circuit 48 would be in an unlocked state for a brief period after the channel select input is changed. When this condition exists the integrator 120 will provide a signal to the mute 122 which will cause the transmit mute 118 to prevent the MODEM 22 from transmitting a signal. When data is ready to be transmitted the terminal support element 24, multiplex terminal support element 30 or the host support element 36 will send a request to send (RTS) signal to the integrator 120. When the integrator 120 receives a request to send a signal it will provide an output to the mute 122 which will cause the transmit mute 118 to allow the signal from the power amplifier 116 to be fed to a filter 126. The output of the filter 126 is fed to the cable 14. Thus, the MODEM 22 will transmit a signal only when the main phase lock loop circuit 48 is locked and a request to send signal is received from the terminal support element 24, the multiplex terminal support element 30 or the host support element 36.

The MODEM 22 may also receive a signal from the cable 14 which is fed to a filter 128. The output of the filter 128 is fed to a mixer 130 which also receives an input from the main phase lock loop circuit 48 which is amplified by the amplifier 108. The output signal from the mixer 130 has a frequency equal to the difference of the frequencies of the inputs and is fed to a filter 132. The output of the filter 132 is fed to a mixer 134 which also receives an input from a 28.15 MHz oscillator 136. The output signal from the mixer 134 has a frequency equal to the difference of the frequencies of the inputs and is fed to a filter 138. The output of the filter 138 is fed to a 16.9 MHz IF amplifier 140. An output of the IF amplifier 140 is fed to a mute amplifier 142. Thus, when a signal on the cable 14 is received by the MODEM 22, the mute amplifier 142 will output a carrier detect (CD) signal. The carrier detect signal is fed to the terminal support element 24, the multiplex terminal support element 30 or the host support element 36.

The output of the IF amplifier 140 is an amplitude modulated signal which is fed to a data decoder network 144. The data decoder 144 includes a precision rectifier 146. The precision rectifier 146 inverts the lower half of each cycle of the input. The output of the precision rectifier 146 is fed to a zero cross detector 148 which also has a zero reference input $V_0$ connected through a resistive element 150. When the input to the zero cross detector 148 from the precision rectifier 146 is zero volts the zero cross detector 148 will produce an output pulse. The output of the precision rectifier 146 is also fed to a one detector 152 which also receives a reference input $V_1$ connected through a resistive element 154. When the input to the one detector 152 from the precision rectifier 146 reaches the level corresponding to a logical "1" the one detector 152 will produce an output pulse. The level of a half cycle corresponding to a logical "0" is lower than the level corresponding to a logical "1". Thus, when a half cycle carries a "0" bit the one detector will not produce an output pulse.

The output of the zero cross detector 148 is fed to a counter 156. The counter 156 receives a 2.048 MHz clock input. The clock frequency is sixteen times the data rate. The counter 156 is reset to zero each time a zero cross is detected by the zero cross detector 148.

The counter 156 will produce an output pulse when the count reaches eight. The counter 156 will then remain in an inactive state until it receives a reset pulse from the zero cross detector 148. A latch 158 receives inputs from the one detector 152 and the counter 156. When the latch 158 receives a pulse from the counter 156 it will output the voltage present at the input from the one detector 152. The counter 156 outputs a pulse at the peak of a half cycle of the input to the data decoder 144. Thus, the latch 158 outputs the received data in a digital form.

The data decoder network 144 also provides a receive clock output (RXCLK). The counter 156 sends a pulse to a counter 160 which also receives an input from the 2.048 MHz clock. The input pulse to the counter 160 from the counter 156 resets the counter 160. The counter 160 will produce an output pulse some number of clock pulses later. The receive clock output (RXCLK) and the receive data output (RXD) of the data decoder 144 are fed to the terminal support element 24, the multiplex terminal support element 30 or the host support element 36. When the support element 24, 30 or 36 receives a pulse from the receive clock output it will read the receive data output (RXD). Thus, the number of clock pulses from the 2.048 MHz clock that will cause the counter 160 to output a pulse should be less than sixteen so that the output of the latch 158 is read by the terminal support element 24, the multiplex support element 30 or the host support element 36 before the next bit of data is output from the latch 158.

In FIG. 3 there is illustrated waveforms for various input and output signals of the data decoder network 144 of the MODEM 22. FIG. 3(A) illustrates an input signal to the data decoder 144 carrying the four bit code of 1001. Each cycle of the signal contains two bits of data where each bit is represented by the amplitude of a half cycle. FIG. 3(B) illustrates the waveform of the output signal from the precision rectifier 146. It may be noted that the lower half cycle of the input to the precision rectifier 146 is inverted. The output from the zero cross detector 148 is illustrated in FIG. 3(C). FIG. 3(D) illustrates the output from the one detector 152 and FIG. 3(E) illustrates the output from the latch 158.

FIG. 4 is a block diagram of the terminal support element 24 of FIG. 1 and further illustrating the interface of MODEM 22 and the terminal 26. The terminal support element 24 includes a central processor unit (CPU) 162 connected to data and address buses 164. The terminal support element 24 also includes a memory block 165 including a random access memory chip (RAM) 166, a programmable read only memory chip (PROM) 168, a read only memory chip (ROM) 170, and an erasable programmable read only memory chip (EPROM) 172. Each chip of the memory block 165 is connected to the data and address buses 164.

The terminal support element 24 also includes an input/output block 174 which includes a support device 176, a universal synchronous receiver/transmitter (USRT) 178, a universal asynchronous receiver/transmitter (UART) 180 and a data encryption/decryption device (CRYPTO) 182. Each chip of the input/output block 174 is connected to the data and address buses 164.

The data and address buses 164 are also connected to a control chip 184. The support device 176 is connected by a plurality of lines to a latch 186. The control chip 184 is connected from several device select outputs to each of the chips in the input/output block 174 and to the latch 186. The control chip 184 receives three address lines which are decoded by the control chip 184. The control chip 184 will then provide an output on one of the device select lines to the appropriate chip corresponding to the address received.

Each of the chips in the input/output block 174 has an interrupt request output (IRQ). The IRQ output of the support device 176 is connected to the I/O port line P0 of the support device 176 and to one input of an open collector AND gate 188. The IRQ output of the USRT 178 is connected to the I/O port line P1 of the support device 176 and to one input of the AND gate 188. The IRQ output of the UART 180 is connected to the I/O port line P2 of the support device 176 and to one input of an open collector AND gate 190. The IRQ output of the CRYPTO 182 is connected to the I/O port line P3 of the support device 176 and to one input of the AND gate 190. The outputs of the AND gates 188 and 190 are connected at a terminal 192. The terminal 192 is connected to the IRQ input of the CPU 162.

When one of the chips in the input/output block 174 requires servicing by the CPU 162 the chip will generate an interrupt request. The IRQ output is normally high and when an interrupt request is generated the IRQ output goes low. Thus, when no interrupt requests are outstanding the inputs to the AND gates 188 and 190 are high and the outputs of the AND gates 188 and 190 are high. When an interrupt request is generated an input to the AND gate 188 or 190 will go low causing the output of the other AND gate 188 or 190 to be drawn low. This result is achieved because the AND gates 188 and 190 are open collector-type AND gates. When the interrupt request is received by the CPU 162 it will read a status register of the support device 176. The status register of the support device 176 is set by the I/O port line P0, P1, P2 or P3 to indicate the source of the interrupt request. The CPU 162 will then service the appropriate chip of the input/output block 174.

The CPU 162 has a RESET output. The RESET output is connected to the devices in the input/output block 174 and to the latch 186. When the power to the terminal support element 24 is turned on the CPU 162 will generate an output on the RESET line. The devices receiving the RESET signal are set to initial conditions.

The CPU 162 has a clock synchronization output labeled E. The E output of the CPU 162 is connected to the RAM 166, the ROM 170, the support device 176, the USRT 178, the CRYPTO 182 and the control chip 184. The clock synchronization output E from the CPU 162 provides a clock signal to the connected devices. The CPU 162 has an output labeled R/$\overline{W}$ connected to the RAM 166, the ROM 170, the support device 176, the USRT 178, the UART 180 and the CRYPTO 182. The R/$\overline{W}$ output of the CPU 162 indicates to the connected devices whether the CPU 162 is in a read or write state.

The latch 186 has eight output lines connected to the channel select inputs of the MODEM 22. The carrier detect output (CD) from the MODEM 22 is connected to the support device 176. The USRT 178 has a TXD output connected to the MODEM 22. The USRT 178 receives TXCLK, RXD and RXCLK inputs from the MODEM 22. The RTS output from the USRT 178 is connected to the MODEM 22.

An EIA converter 194 is connected to the UART 180 by a plurality of lines 195 which carry the necessary signals for the terminal 26. The EIA converter 194 is connected to the terminal 26 by a plurality of lines 196. The EIA converter 194 transforms the signals passing between the UART 180 and the terminal 26 to the appropriate level.

The CRYPTO 182 is an optional feature of the terminal support element 24. The CRYPTO 182 provides for encryption and decryption of data transmitted over the cable 14. The PROM 168 provides the "key" for the encryption and decryption. A receiving support element 24, 30 or 36 must have the same "key" as the transmitting support element 24, 30 or 36.

The RAM 166 provides for extended data buffering to increase the capability of the data communication system 10. The EPROM 172 allows for the addition of special features to the data communication system 10.

Figure 5:
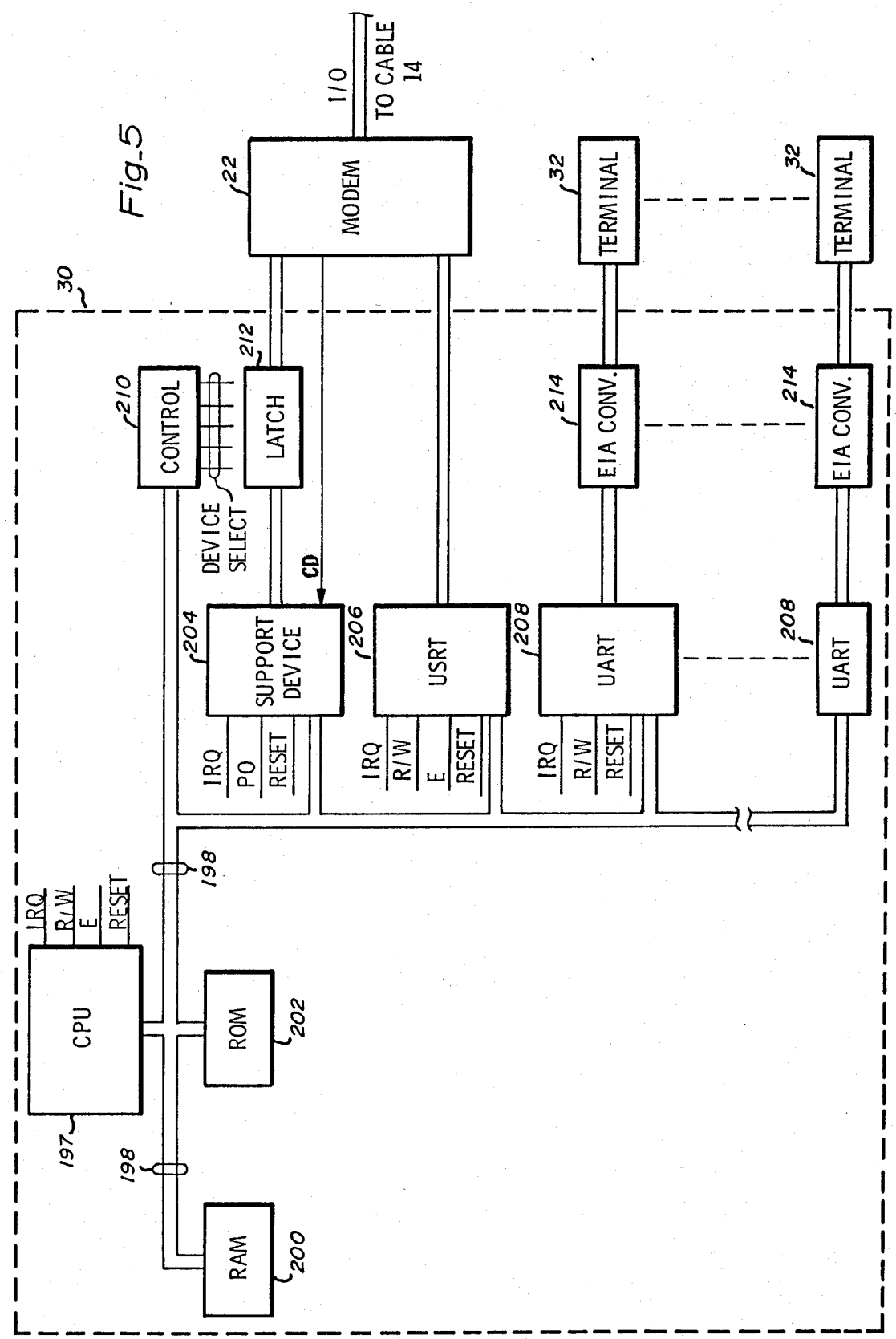
FIG. 5 is a block diagram of the multiplex terminal support element of the system of FIG. 1.

FIG. 5 is a block diagram of the multiplex terminal support element 30 and also shows the connection to the MODEM 22 and to the terminals 32. The architecture of the multiplex terminal support element 30 is similar to that of the terminal support element 24. The encryption/decryption feature illustrated in FIG. 4 has been omitted and also the EPROM 172 for provision of special features is not shown. These features may be included in the multiplex terminal support element 30 but are omitted to simplify the description. The CRYPTO 182 and PROM 168 would be necessary in the multiplex terminal support element 30 if encrypted data is to be received or transmitted.

The multiplex terminal support element 30 includes a CPU 197 which is connected to a data and address bus 198. A RAM 200 is connected to the data and address buses 198. The RAM 200 includes approximately two thousand bytes of memory. A ROM 202 is also connected to the data and address buses 198. The ROM 202 includes approximately four thousand bytes of memory. Also connected to the data and address buses 198 are a support device 204, a USRT 206, eight UARTs 208 and a control 210. The support device 204 is connected to a latch 212 by eight parallel lines. The latch 212 is connected to the channel select input of the MODEM 22 by eight parallel lines. The support device 204 receives a carrier detect input from the MODEM 22. The USRT 206 is connected to the MODEM 22. Each of the eight UARTs 208 is connected to an EIA converter 214 and each of the eight EIA converters 214 is connected to one of the eight terminals 32.

The multiplex terminal support element 30 requires a larger block of random access memory than the terminal support element 24. The multiplex terminal support element 30 also includes eight UARTs 208 where the terminal support element 24 includes only one UART 180. The eight UARTs 208 are necessary to enable the multiplex terminal support element 30 to be connected to the eight terminals 32. The read/write, clock synchronization reset and interrupt request signal are connected to and from the CPU 197 in the same manner as with the CPU 162 of the terminal support element 24. The device select outputs from the control 210 are connected in the same manner as for the control 184 of the terminal support element 24, the only difference being that additional device select outputs are necessary from the control 210 to connect to the additional UARTs 208.

FIG. 6 is a block diagram of the host support element 36 of FIG. 1 and also shows the connection to the MODEM 22 and to the host computer 38. The architecture of the host support element 36 is similar to that of the terminal support element 24 and the multiplex terminal support element 30. Again the encryption/decryption feature of CRYPTO 182 and the EPROM 172 have been omitted for simplification.

The host support element 36 includes a CPU 216. The CPU 216 is connected to a data and address bus 218. A RAM 220 is connected to the data and address bus 218. The RAM includes approximately two thousand bytes of memory. A ROM 222 is also connected to the data and address buses 218. The ROM 222 includes approximately four thousand bytes of memory. Also connected to the data and address buses 218 are a support device 224, a USRT 226, a direct memory access controller (DMAC) 228, a host interface 230 and a control 232. The support device 224 is connected to a latch 234 by eight parallel lines. The latch 234 is connected to the channel select input of the MODEM 22 by eight parallel lines. The support device 224 receives a carrier detect input from the MODEM 22. The USRT 226 is connected to the MODEM 22. The host interface 230 is connected to the host computer 38.

The host interface 230 comprises a circuit supplied by the manufacturer of the host computer 38. The host interface 230 will interface the signals from the host computer 38 to the host support element 36. The DMAC 228 transfers data directly between the RAM 220 and the host interface 230. The direct memory access feature is included in the host support element 36 to facilitate the higher speed generally encountered with the host computer 38.

FIG. 7 is a block diagram of the channel bridge 18 of FIG. 1. The channel bridge 18 includes a CPU 236 connected to a data and address bus 238. The channel bridge 18 also includes a RAM 240 and a ROM 242 each connected to the data and address bus 238. Also connected to the data and address bus 238 are a support device 244, a plurality of USRTs 246, a DMAC 248, a UART 250 and a control 252. The support device 244 is connected to a plurality of latches 254 by eight parallel lines. Each of the latches 254 is connected to the channel select input of each of the MODEMs 22. Each of the USRTs 246 is connected to one of the MODEMs 22. Each of the MODEMs 22 is connected to a signal splitter 256. The signal splitter 256 is connected to the coaxial cable 14. The UART 250 is connected to an EIA converter 258. The EIA converter 258 has an input/output terminal 260 to provide programmer access to the channel bridge 18. The control 252 has a separate output connected to each of the latches 254.

The channel bridge 18 receives signals on a channel and searches for packets of data directed to a different channel and then retransmits those packets onto the appropriate channel. Each MODEM 22, included in the channel bridge 18, is set to a different channel, thus the channel bridge 18 is capable of providing a direct bridge between a number of channels equal to the number of MODEMs 22 included in the channel bridge 18. Data received by the MODEM 22 is transferred to the USRT 246. When data is being received by several USRTs 246 simultaneously the CPU 236 will become overburdened and incapable of transferring the data to the RAM 240. Thus, the DMAC 248 is used to control the transfer of data from the USRTs 246 to the RAM 240.

The channel on which the MODEMs 22 operate is selected by storing the appropriate value for the desired channel in the support device 244, then the appropriate latch 254 is selected by the control 252 and the output of the latch 254 is held at the desired value. The channel of each of the MODEMs 22 may be set by enabling the appropriate latch 254.

In practice the number of channels bridged by the channel bridge 18 is limited by the rate at which received data may be transferred to the RAM 240 and back to the USRT 246. Thus, several channel bridges 18 may be required for the data communication system 10. Where several channel bridges 18 are included in the data communication system 10 a packet of data may need to be routed through more than one channel bridge 18. Routing through more than one channel bridge 18 may be handled by means of a routing table stored in the RAM 240.

FIG. 8 illustrates the data format used by the data communication system 10. The terminal interface 20, the multiplex terminal interface 28, or the host computer interface 34 will transmit a frame of data, referred to by the general reference numeral 300, onto the cable 14. The frame of data 300 is comprised of bytes of data. Generally each byte is comprised of eight bits of data where a bit is a logical "1" or "0". The first byte of the frame 300 is a flag 302. The flag 302 has a fixed value of 01111110 and is used to indicate to a receiver that a stream of data is following. Following the flag 302 is a data field 304. Following the data field 304 is a cyclic redundancy check field 306. The cyclic redundancy check field 306 is two bytes in length and is a value generated by the transmitter for the data field 304. The receiver generates a cyclic redundancy check value for the received frame 300 and by comparing with the value of the received cyclic redundancy check field 306 the receiver detects transmission errors. Following the cyclic redundancy check field 306 is a flag 308. The flag 308 has the same value as the flag 302 and indicates the end of the frame 300.

The data field 304 comprises a datagram referred to by the general reference numeral 310. The datagram 310 includes a destination node address 312. The destination node address 312 is the first byte of the datagram 310 and indicates the node which is to receive the frame 300. In the present preferred embodiment a node is defined to be a point in the cable 14 where the terminal interface 20, the multiplex terminal interface 28 or the host computer interface 34 is connected. Each node is assigned a unique address.

The datagram 310 also includes a channel number field 314 following the destination node address 312. The channel number field 314 is one byte in length. The channel number field 314 indicates the channel on which the destination node is located. When the destination node's channel is different from the source node's channel the frame 300 is routed through the channel bridge 18. The channel on which a node is located is determined by the channel select input to the MODEM 22.

Following the channel number field 314 is a transport control field 316. The transport control field 316 is one byte in length. The transport control field 316 is followed by a data field 318.

The data field 318 comprises a packet referred to by a general reference numeral 320. The first byte of the packet 320 is a port field 322. The port field 322 is one byte in length and indicates the destination within a node, for example, one of the terminals 32 connected to the multiplex terminal interface 28. A control field 324 follows the port field 322 and is one byte in length. Following the control field is a data field 326 which can be any length less than 64 bytes.

FIG. 8A illustrates the subfields of the transport control field 316. A version field 328 comprises the first two bits of the transport control field 316. The version field 328 is used to indicate the format of the data contained in the packet 320. The third and fourth bits of the transport control field 316 are not used in the presently preferred embodiment. A hop count field 330 comprises the last four bits of the transport control field 316. When a packet 320 is transmitted by a node the hop count field 330 has an initial value of seven. Each time the packet 320 is routed through the channel bridge 18 the value of the hop count field is decremented by one. When the value of the hop count field equals zero, the packet 320 is discarded. This prevents indefinite looping of packets in the data communication network 10 due to transmission errors.

FIG. 8B illustrates the subfields of the control field 324 when the first bit of the control field 324 is a "1". When the first bit of the control field 324 is a "1" the packet 320 is a data packet. In a data packet the data field 326 contains the information being communicated. Following the first bit of the control field 324 in a data packet is a flow control bit 332. The flow control bit 332 is used to adjust for a possible speed mismatch between the transmitting node and the receiving node. Following the flow control bit 332 in a data packet is a sequence field 334. The sequence field 334 is three bits in length. Following the sequence field 334 in a data packet is an acknowledgement field 336. The acknowledgement field 336 is three bits in length.

The sequence field 334 is incremented each time a packet is sent, thus, indicating the order of the packets sent and enabling the receiver to disassemble the packets 320 in the correct order. The acknowledgement field indicates the value of the sequence field 334 for the last correctly received data packet.

When a receiving node runs out of buffer space to store the received data it will discard the received packet 320 and transmit a data packet with the value of the acknowledgement field 336 set to the value of the sequence field 334 of the previously received packet 320 and will set the flow control bit 332 to enable flow control. In the flow control enabled state the transmitting node will delay transmission of the next packet 320 by a predetermined time delay.

When the transmission of a packet 320 has not been acknowledged by the receiving node, then after a predetermined time interval the transmitting node will retransmit the unacknowledged packet. After five retransmission attempts the connection will be aborted.

FIG. 8C illustrates the control field 324 when the first bit is "0". A "0" in the first bit of the control field 324 indicates a control packet. A control type field 338 follows the first bit of the control packet 324. The control type field 338 contains a control message for the other node in a connection. The types of control messages include open connection request, open connection acknowledged, open connection nonacknowledged, close connection request and close connection acknowledged.

An open connection request control message signals to another (receiving) node in the data communication system 10 that the transmitting node request a connection. An open connection acknowledged control message is sent by the receiving node to signal the transmitting node that the receiving node is ready to accept transmitted data. At this point a connection is established between the transmitting and receiving nodes. An open connection nonacknowledged is sent by the receiving node to signal the transmitting node that the receiving node is not ready to receive transmitted data in which case no connection is established. A close connection request control message signals the other node in a connection to close the connection. A close connection acknowledged signals the other node in a connection that a closed connection request was received and thus terminates the connection.

The operation of the data communication system 10 may now be illustrated by way of describing a communication between the terminal 26 and the host computer 38. In such a situation, a user will type a request at the terminal 26 to open a connection with the host computer 38. The user at this time will input the address of the host computer 38. The request will be transmitted to the UART 180 of the terminal support element 24. The UART 180 will output an interrupt request signal to the CPU 162. The CPU 162 will respond to the interrupt request by reading the status register of the UART 180 which will tell the CPU 162 to begin transferring the contents of the registers to the RAM 166. After the data from the terminal 26 has been transferred to the RAM 220 of the host support element 36, the CPU 162 will then read the contents of the RAM 166 which will contain the open connection request. The CPU 162 will assemble the datagram 310 (illustrated in FIG. 8) with the node and channel address for the host computer 38, set the version and hop count of the transport control field 316, set the first bit of the control field 324 to "0" and set the value of the control type field 338 to the code for an open connection request control message. The data field 326 will contain the address of the terminal interface 20. The assembled datagram 310 is then transferred to the USRT 178 of the terminal support element 24. As the datagram 310 is received by the USRT 178, it will generate a cyclic redundancy check value which will be placed in the cyclic redundancy check field 306.

Before the CPU 162 enables the USRT 178 to transfer the data to the MODEM 22, the CPU 162 will read the status register of the support device 176 which will indicate whether or not the carrier detect signal is being generated by the MODEM 22. If the carrier detect signal is being output by the MODEM 22, indicating that coaxial cable 14 is being used, then the CPU 162 will delay enabling the USRT 178 until the carrier detect signal indicates that cable 14 is free. When the cable 14 is free the CPU 162 will enale the USRT 178. The USRT 178 will transmit a request to send signal to the MODEM 22. When the MODEM 22 receives the request to send signal it will disenable the transmit mute 118 thus, allowing an output signal to be broadcast onto the coaxial cable 14. The USRT 178 will then begin to serially transmit the frame 300 to the MODEM 22.

Each time a transmit clock pulse is received from the MODEM 22 the USRT 178 will output a bit of data. The bit of data will be received by the data encoder 84 of the MODEM 22. The data encoder 84 will encode the data into an amplitude modulated output. The amplitude modulated output of the data encoder 84 is received by the voltage controlled oscillator 70. The frequency of the output from the voltage controlled oscillator 70 is determined by the voltage of the inputs from the phase comparator 82 and the data encoder 84. The voltage of the input from the data encoder 84 will be constantly varying, thus, the output frequency from the voltage controlled oscillator 70 will vary according to the amplitude of the input from the data encoder 84. Thus, the data is encoded into a frequency modulated signal. The output of the voltage controlled oscillator 70 is mixed with the output of the main phase lock loop circuit 48 by the mixer 106, thereby making the transmit frequency a function of the channel select input. The output of the mixer 106 is amplified and then transmitted onto the cable 14. When the entire frame 300 has been output from the USRT 178 the request to send signal will be turned off and the MODEM 22 will cease transmitting.

The signal transmitted by the MODEM 22 will be received by the central retransmission facility 12. The central retransmission facility 12 translates the frequency of the received signal to a mathematically related higher frequency and rebroadcasts the signal at the higher frequency. In the preferred embodiment the central retransmission facility will rebroadcast the signal at a frequency 156.25 MHz higher than the frequency of the received signal. The unidirectional taps 16 permit only signals in the frequency range of approximately 17.7 to 47.7 MHz to be transmitted in the direction towards the central retransmission facility 12 and only signals in the frequency range of approximately 173.95 to 203.95 MHz to be transmitted in the direction away from the central retransmission facility 12. Thus, a communication channel is comprised of a transmit frequency bandwidth in the frequency range of approximately 17.7 to 47.7 MHz and a receive frequency range of approximately 173.95 to 203.95 MHz.

The signal rebroadcast by the central retransmission facility 12 will be received by the MODEM 22 included in the host computer interface 34. The signal received by the MODEM 22 will be fed through the mixer 130 within the MODEM 22. The mixer 130 will also receive an input from the main phase lock loop circuit 48. Thus, both the transmit frequency and receive frequency are jointly stepped when the channel select input to the main phase lock loop circuit 48 is changed. The output of the mixer 130 is eventually fed to the IF amplifier 140. The IF amplifier 140 converts the frequency modulated input to an amplitude modulated output. The amplitude modulated output of the IF amplifier 140 is then fed to the data decoder 144. The data decoder 144 converts the amplitude modulated input to a serial digital output identical to the frame 300 generated by the terminal support element 24. The output of the data decoder 144 is then fed to the host support element 36.

The data received by the host support element 36 is fed to the USRT 226. The first eight bits of data are the flag 302 which indicates the start of the frame 300. The next two bytes of data are the node field 312 and the channel field 314 which the USRT 226 internally compares to the address of the host support element 36. This same comparison is made by all nodes on the channel. The USRT 178 of the terminal support element 24 will receive back the flag 302 if the transmission of the frame 300 has not collided with a transmission by another node. If the USRT 178 does receive the flag 302 it will continue the transmission in the normal manner. However, if the USRT 178 does not receive the flag 302 it is presumed that a data collision has occurred and the USRT 178 will stop transmitting the frame 300. The USRT 178 will then send an interrupt request signal to the CPU 162. The CPU 162 will respond to the interrupt request by waiting a random time and then retransmitting the frame 300. The random backoff will assure that the terminal support element 24 does not restart transmission at the same time that the transmission from the other node is restarted.

If the node field 312 and the channel field 314 contain the address of the host support element 36 then the USRT 226 will send an interrupt request signal to the CPU 216. The CPU 216 will respond to the interrupt request by enabling the DMAC 228 which will transfer the incoming data from the USRT directly to the RAM 220. As the data is received by the USRT 226 a cyclic redundancy check value is internally computed. When the final flag 308 is received, the cyclic redundancy check value computed by the USRT 226 is compared to the cyclic redundancy check value contained in the cyclic redundancy check field 306. If a transmission error is detected the USRT 226 will output an interrupt request to the CPU 216. If no transmission error is detected the CPU 216 will read the datagram 310 from the RAM 220.

The CPU 216 will then read the control field 324 which contains the open connection request control message and the address of the terminal interface 20. If the host computer 38 has an open port the CPU 216 will assemble an open connection acknowledged data packet. The data field 326 of the return packet 320 will contain the address of the host computer interface 34 plus a port address. All future transmissions by the terminal interface 20 will contain the port address in the port field 322. The open connection acknowledged data packet will be transmitted by the host computer 38 in a manner similar to that described for the terminal interface 20.

When the open connection acknowledged control message is received by the terminal interface 20 a connection is established. Once the connection is established the terminal 26 and the host computer 38 may transmit information back and forth between each other. Each time the terminal 26 sends a data packet the sequence field 334 will be incremented and the acknowledgement field 336 will be set to the sequence number of the highest consecutively numbered data packet received from the host computer 38. Likewise, each time the host computer 38 sends a data packet the sequence field 334 will be incremented and the acknowledgement field 336 will be set to the sequence number of the highest consecutively numbered data packet received from the terminal 26.

When all communication with the host computer 38 is complete the user will type a request at the terminal 26 to close the connection. The terminal support element 20 will transmit the request to the host support element 34. The host support element 34 will send back a close connection acknowledgement to the terminal support element 20 which will terminate the connection.

Communication through the channel bridge 18 may be illustrated by the following example. A transmitting node is assigned to Channel A and a receiving node is assigned to Channel B. In order for the transmitting node to send data to the receiving node the data must be routed through the channel bridge 18. The channel bridge 18 includes one MODEM 22 set to Channel A and one MODEM 22 set to Channel B. The MODEM 22 set to Channel A feeds the incoming data to the USRT 246. The USRT 246 will see the flag 302 and then load the next two bytes into registers and compare the channel field 314 to the code for Channel A. If the channel field 314 contains the address of Channel A the USRT 246 will not send an interrupt request to the CPU 236 since the data does not need to be transferred to another channel. If the channel field 314 does not contain the address of Channel A then the USRT 246 will send an interrupt request to the CPU 236. The CPU 236 will respond to the interrupt request by enabling the DMAC 248 which will transfer the received data from the registers of the USRT 246 to the RAM 240. The USRT 246 will perform the cyclic redundancy check and send an interrupt request to the CPU 236 if a transmission error is detected.

After the received data has been transferred to the RAM 240, the CPU 236 will read the channel field 314 containing the address for Channel B and then begin transferring the received data to the USRT 246 which is connected to the MODEM 22 set to Channel B. If no other transmissions are detected on Channel B the request to send signal will be sent to the MODEM 22 and the data will be transmitted onto the cable 14 on Channel B. The USRT 246 associated with Channel B will perform collision detection for the frame 300 retransmitted onto Channel B in the same manner as was done with the USRT 178 of the terminal support element 24. The receiving node will then detect and receive the data in the normal manner.

The data communication system 10 provides increased data communication capacity through the connection of channels by the channel bridge 18. Low cost of the MODEM 22 is achieved by use of the DAC 98 to produce an amplitude modulated signal which is then used to produce a frequency modulated signal for transmission thus enabling the use of less expensive filters. The programmable channel select feature is made possible by the use of two phase lock loop circuits. The overall expense of installing the data communication system 10 is reduced by the capability for use of existing CATV coaxial cable networks.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A MODEM for data communication comprising in combination:

a main phase lock loop circuit electrically connected to a fixed frequency temperature compensated oscillator circuit and including a main frequency divider connected to the fixed frequency oscillator circuit for dividing a first output signal from the fixed frequency oscillator circuit by a first fixed factor and for providing a main fixed frequency output signal, a main mixer electrically connected to the fixed frequency oscillator circuit and a main feedback loop for modifying a reference signal frequency from the fixed frequency oscillator circuit, a programmable divider connected to said main mixer and a plurality of channel select lines connected to a support element, each of said plurality of channel select lines including a binary value for determining the divisor of the programmable divider, a main phase comparator joined to said main frequency divider and said programmable divider for comparing said main fixed frequency output signal of the main frequency divider and an output signal frequency of the programmable divider, said main feedback loop including a main voltage controlled oscillator electrically connected to said main mixer and said main phase comparator for providing a main voltage controlled oscillator output signal with a main oscillator output signal frequency controlled by an output voltage signal from said main phase comparator, said main phase comparator adjusting said output voltage signal from said main phase comparator until said main oscillator output signal frequency is fixed, wherein said main oscillator output signal frequency of said main voltage controlled oscillator is dependent upon said binary value of said channel select lines;

a transmitter for generating a frequency modulated signal including a transmit phase lock loop circuit comprising a first transmit frequency divider connected to said fixed frequency oscillator circuit for dividing a second output signal from the fixed frequency oscillator circuit by a second fixed factor and providing a first transmit fixed frequency output signal, a transmit mixer electrically connected to the fixed frequency oscillator circuit and a transmit feedback loop within the transmit phase lock loop circuit for providing an output frequency signal of said transmit mixer equal to the difference between the frequency of a third output signal from the fixed frequency oscillator circuit and the frequency of an output signal of said transmit feedback loop, a second transmit frequency divider connected to said transmit mixer for dividing an output signal frequency of said transmit mixer by a third fixed factor and for providing a second transmit fixed frequency output signal, a transmit phase comparator connected to said first transmit frequency divider and to said second transmit frequency divider for comparing said first transmit fixed frequency output signal and said second transmit fixed frequency output signal, said transmit feedback loop including a transmit voltage controlled oscillator electrically connected to said transmit mixer and said transmit phase comparator to provide a transmit voltage controlled oscillator output signal with a transmit oscillator output signal frequency controlled by an output voltage signal from said transmit phase comparator and by an amplitude modulated signal from a data encoder, said transmit voltage controlled oscillator output signal being said frequency modulated signal and having a center frequency generated by the transmit phase lock loop circuit, said main oscillator output signal frequency being differentially combined with said transmit oscillator output signal frequency within an output mixer electrically connected to said main voltage controlled oscillator and said transmit voltage controlled oscillator to provide a transmitter output signal to a coaxial transmission cable wherein and output frequency bandwidth of the transmitter is determined by said channel select lines; and a receiver for providing a digital data output including a first receiver mixer connected to said main voltage controlled oscillator within the main phase lock loop circuit and the coaxial cable for differentially combining the frequencies of a frequency modulated receive signal with a main oscillator output signal frequency and for providing a first receiver mixer signal, a first filter connected to said first receiver mixer for filtering said first receiver mixer signal and for providing a filtered first receiver mixer signal, a second receiver mixer connected to said first filter and a receiver oscillator for differentially combining said filtered first receiver mixer signal and a receiver oscillator signal for providing a second receiver mixer signal, a second filter connected to said second receiver mixer for filtering said second receiver mixer signal, said filtered second receiver mixer signal being a frequency modulated signal, an intermediate frequency amplifier connected to said second filter for amplifying said filtered second receiver mixer signal and for providing an amplified amplitude-modulated second receiver mixer signal to a data decoder and to a signal detecting means for detecting a signal received by the translating means from said transmission cable wherein said signal detecting means is a mute amplifier for providing a carrier detect signal to a support element for preventing data collision, and said data decoder for providing said digital data output and wherein the receive frequency bandwidth of the receiver being determined by said channel select lines.

2. The MODEM for data communication of claim 1, further comprising;
   muting means connected to the transmitter and including a mute circuit electrically connected to the main phase lock loop circuit for receiving a muting signal, and a mute drive circuit electrically connected to said mute circuit for driving a transmit mute circuit, said transmit mute circuit for muting said transmitter output signal when said muting signal is present for preventing said transmitter output signal from being transmitted onto said coaxial cable.

3. The MODEM for data communication of claim 2, further comprising;
   integrator means connected to said main phase comparator of the main phase lock loop circuit for enabling the muting means, said integrator means receiving a muting means output signal from said main phase comparator wherein the transmitter output signal is muted when the main phase lock loop circuit is unlocked after said channel select lines are changed, said integrator means further receiving a request to send input signal from said support element when a plurality of data is to be transmitted for providing an antimuting signal to said mute circuit.

4. A transmitter for data communication comprising in combination:
   a data encoder for encoding digital data into an amplitude modulated signal including a clock for generating pulses, a first binary counter connected to the clock by four output lines for representing a binary value wherein said binary value of the first binary counter being incremented by one for each clock pulse for providing a first binary output pulse, said first binary output pulse being zero for each sixteenth clock pulse, a second binary counter connected to the clock for providing a second binary output pulse for each sixteenth clock pulse, a flip-flop means connected to said second binary counter for receiving said second binary output pulse and for providing a flip-flop output signal, said flip-flop output signal changing state with each second binary output pulse, a memory storage device connected to the first binary counter wherein a memory location within the memory storage device is addressed by said first binary output pulse from the first binary counter and by a transmit data input provided by a support element, said transmit data input for providing a plurality of digital data to be encoded by said data encoder, said addressed memory location for providing a memory output signal, an inverting means connected to said memory storage device and said flip-flop means for providing an inverted output, said inverted output being the digital complement of said memory output signal from said memory storage device when said flip-flop output signal is a logical one, a digital-to-analog converter connected to said inverting means for generating a voltage output selected by said inverted output wherein a plurality of said voltage outputs from the digital-to-analog converter provide said amplitude modulated signal for transmission upon a broadband coaxial cable, the amplitude of said amplitude modulated signal being determined by said plurality of digital data being encoded, said inverting means inverting alternate half-cycles of said amplitude modulated signal for providing two bits of data per cycle and said flip-flop output signal being a transmit clock signal tranmitted to said support element for signaling the demand for said transmit data input; and
   a transmit phase lock loop circuit connected to the data encoder wherein said amplitude modulated signal is translated into a frequency modulated signal, said transmit phase lock loop circuit including a first transmit frequency divider connected to a fixed frequency oscillator circuit for dividing a first transmit input signal from the fixed frequency oscillator circuit by a first transmit factor and for providing a first transmit fixed frequency output signal, a transmit mixer connected to said fixed frequency oscillator circuit and a transmit feedback loop for providing an output frequency signal of said transmit mixer equal to the difference between the frequency of a second transmit input signal from said fixed frequency oscillator circuit and the frequency of an output signal of said transmit feedback loop, a second transmit frequency divider connected to said transmit mixer for dividing an output signal frequency of said transmit mixer by a second transmit factor and for providing a second transmit fixed frequency output signal, a transmit phase comparator connected to said first transmit frequency divider and to said second transmit frequency divider for comparing said first transmit fixed frequency output signal and said second transmit fixed frequency output signal, and said transmit feedback loop including a transmit voltage controlled oscillator electrically connected to said transmit mixer and said transmit phase comparator for providing a transmit voltage controlled oscillator output signal with a transmit oscillator output signal frequency controlled by an output voltage signal from said transmit phase comparator and by said amplitude modulated signal from said data encoder, said transmit voltage controlled oscillator output signal being said frequency modulated signal and having a center frequency generated by the transmit phase lock loop circuit.

5. The transmitter of claim 4, further comprising
   a first amplifier means connected to the transmit phase lock loop circuit for amplifying said transmit oscillator output signal frequency;

a second amplifier means connected to a main phase lock loop circuit for amplifying a main oscillator output signal frequency;

an output mixer connected to said first and said second amplifier means, said output mixer for differentially combining an amplified transmit oscillator output signal frequency with an amplified main oscillator output signal frequency for providing a transmitter output signal to a coaxial cable;

muting means connected to said output mixer and including a mute circuit electrically connected to the main phase lock loop circuit for receiving a muting signal; and a mute drive circuit electrically connected to said mute circuit for driving a transmit mute circuit, said transmit mute circuit for muting said transmitter output signal when said muting signal is present and for preventing said transmitter output signal from being transmitted onto said coaxial cable.

6. A data encoder comprising in combination:

a clock for generating pulses;

a first binary counter connected to the clock by four output lines for representing a binary value wherein said binary value of the first binary counter being incremented by one for each clock pulse for providing a first binary output pulse, said first binary output pulse being zero for each sixteenth clock pulse;

a second binary counter connected to the clock for providing a second binary output pulse for each sixteenth clock pulse;

a flip-flop means connected to said second binary counter for receiving said second binary output pulse and for providing a flip-flop output signal, said flip-flop output signal changing state with each of said second binary output pulse;

a memory storage device connected to the first binary counter wherein a memory location within the memory storage device is addressed by said first binary output pulse from the first binary counter and by a transmit data input provided by a support element, said transmit data input for providing a plurality of digital data to be encoded by said data encoder and said addressed memory location for providing a memory output signal;

an inverting means connected to said memory storage device and said flip-flop means for providing an inverted output, said inverted output being the digital complement of said memory output signal from said memory storage device when said flip-flop output signal is a logical one; and a digital-to-analog converter connected to said inverting means for generating a voltage output selected by said inverted output wherein a plurality of said voltage outputs from the digital-to-analog converter provide an amplitude modulated signal for transmission upon a broadband coaxial cable, the amplitude of said amplitude modulated signal being determined by said plurality of digital data being encoded, said inverting means inverting alternate half-cycles of said amplitude modulated signal for providing two bits of data per cycle and said flip-flop output signal being a transmit clock signal transmitted to said support element for signaling the demand for said transmit data input.

7. A receiver for data communication comprising in combination:

translating means for translating a frequency modulated signal into an amplitude modulated signal with the receive frequency bandwidth of the receiver being determined by a plurality of channel select lines within a main phase lock loop circuit, the translating means including a first receiver mixer connected to a main voltage controlled oscillator within the main phase lock loop circuit and a broadband co-axial transmission cable for differentially combining the frequencies of a frequency modulated receive signal from said transmission cable with a main oscillator output signal frequency of said main voltage controlled oscillator and for providing a first receiver mixer signal, a first filter connected to said first receiver mixer for filtering said first receiver mixer signal and for providing a filtered first receiver mixer signal of approximately 45.05 MHz, a second receiver mixer connected to said first filter and a receiver oscillator for differentially combining said filtered first receive mixer signal and a receiver oscillator signal for providing a second receiver mixer signal, a second filter connected to said second receiver mixer for filtering said second receiver mixer signal, said filtered second receiver mixer signal being said frequency modulated signal of approximately 16.9 MHz, an intermediate frequency amplifier connected to said second filter for amplifying said filtered second receiver mixer signal and for providing an amplified second receiver mixer signal to a signal detecting means, said amplified second receiver mixer signal being said amplitude modulated signal of approximately 16.9 MHz and said signal detecting means for detecting a signal received by the translating means from said transmission cable; and a data decoder connected to the translating means for providing decoded digital data from said amplitude modulated signal including a precision rectifier connected to said intermediate frequency amplifier for receiving said amplitude modulated signal and for inverting a lower half of each of a plurality of cycles of said amplitude modulated signal present at an input terminal of the data decoder providing a plurality of half cycles having two bits of data per cycle, a zero level detector connected to said precision rectifier and to a first reference input voltage for providing a zero level detector output pulse when a signal input from said precision rectifier to said zero level detector is encoded with a logical zero, a one level detector connected to said precision rectifier and to a second reference input voltage for providing a one level detector output pulse when a signal input from said precision rectifier to said one level detector is encoded with a logical one, a clock electrically connected to the data decoder for generating a plurality of clock pulses, a first counter connected to said zero level detector and said clock, said first counter being reset to zero with each zero level detector output pulse, said first counter for providing a first counter output pulse following a first predetermined number of clock pulses whereafter said first counter being inactive until reset to zero and for providing a first counter output pulse at the peak of each of a plurality of half cycles present at said input terminal of the data decoder, a latch connected to said one level detector and to said first counter for transmitting a voltage signal present at an output terminal of said one level detector in a digital format when said first counter provides an output pulse at the peak of each of said plurality of half cycles, and a second counter connected to said first counter and said clock for receiving a reset input pulse from said first counter and for providing a second counter output pulse following a second predetermined number of clock pulses, said second counter output pulse being transmitted to a support element for signaling said support element that said voltage signal at said output terminal of said one level detector is present.

8. The receiver for data communication of claim 7 wherein said signal detecting means connected to the translating means is a mute amplifier for providing a carrier detect signal to a support device within said support element for preventing distortion of data on said transmission cable.

9. A data decoder for providing decoded digital data comprising in combination:
a precision rectifier for receiving an amplitude modulated signal from a translating means and for inverting a lower half of each of a plurality of cycles of said amplitude modulated signal present at an input terminal of the data decoder providing a plurality of half cycles having two bits of data per cycle;
a zero level detector connected to said precision rectifier and to a first reference input voltage through a first resistive element, said zero level detector being a first operational amplifier for providing a zero level detector output pulse when a signal input from said precision rectifier to said zero level detector is encoded with a logical zero;
a one level detector connected to said precision rectifier and to a second reference input voltage through a second resistive element, said one level detector being a second operational amplifier for providing a one level detector output pulse when a signal input from said precision rectifier to said one level detector is encoded with a logical one;
a clock electrically connected to the data decoder for generating a plurality of clock pulses having a clock frequency of sixteen times the data rate of the data decoder;
a first counter connected to said zero level detector and said clock, said first counter being reset to zero with each zero level detector output pulse, said first counter for providing a first counter output pulse following a first predetermined number of clock pulses whereafter said first counter being inactive until reset to zero and for providing a first counter output pulse a the peak of each of a plurality of half cycles present at said input terminal of the data decoder, said first predetermined number of clock pulses being eight;
a latch connected to said one level detector and to said first counter for transmitting a voltage signal present at an output terminal of said one level detector in a digital format when said first counter provides an output pulse at the peak of each of said plurality of half cycles; and
a second counter connected to said first counter and said clock for receiving a reset input pulse from said first counter and for providing a second counter output pulse following a second predetermined number of clock pulses, said second counter output pulse being transmitted to a support element for signaling said support element that said voltage signal at said output terminal of said one level detector is present, said second predetermined number of clock pulses being less than sixteen.

10. A method for encoding digital data into an amplitude modulated signal comprising the steps of:
generating pulses for clocking a pair of counters for representing a binary value;
incrementing said binary value of a first of said pair of counters by one for each generated pulse for providing a first binary output pulse which is zero for each sixteenth generated pulse;
providing a second binary output pulse from a second of said pair of counters for pusling a flip-flop circuit;
providing a flip-flop output signal responsive to said second binary output pulse for changing state with each second binary output pulse;
receiving a plurality of digital data by a memory storage device from a support element and said first binary output signal from said first of said pair of binary counters for addressing a plurality of memory locations;
stepping through a sequence of said memory locations within said memory storage device wherein a prearranged sequence of memory output signals are generated such that said sequence of memory output signals is one of two sequences selected by the plurality of digital data received by said memory storage device;
inverting said memory output signal for providing an inverted output signal when said flip-flop output signal is a logical one, said inverted output signal being the digital complement of said memory output signal; and
converting said sequence of memory output signals from said memory storage device to a plurality of voltage output signals for generating a half cycle of an amplitude modulated signal with the amplitude of said half cycle being determined by the plurality of digital data received by said memory storage device.

11. A method for encoding digital data into a frequency modulated signal comprising the steps of:
generating pulses for clocking a pair of counters for representing a binary value;
incrementing said binary value of a first of said pair of counters by one for each generated pulse for providing a first binary output pulse which is zero for each sixteenth generated pulse;
providing a second binary output pulse from a second of said pair of counters for pulsing a flip-flop circuit;
providing a flip-flop output signal responsive to said second binary output pulse for changing state with each second binary output pulse;
receiving a plurality of digital data by a memory storage device from a support element and said first binary output signal from said first of said pair of binary counters for addressing a plurality of memory locations;
stepping through a sequence of said memory locations within said memory storage device wherein a prearranged sequence of memory output signals are generated such that said sequence of memory output signals is one of two sequences selected by the plurality of digital data received by said memory storage device;

inverting said memory output signal for providing an inverted output signal when said flip-flop output signal is a logical one, said inverted output signal being the digital complement of said memory output signal;

converting said sequence of memory output signals from said memory storage device to a plurality of voltage output signals for generating a half cycle of an amplitude modulated signal with the amplitude of said half cycle being determined by the plurality of digital data received by said memory storage device;

amplifying and filtering a plurality of said half cycles of the amplitude modulated signal for delivering to a transmit phase lock loop circuit;

dividing a first transmit input signal within the transmit phase lock loop circuit by a first transmit factor for providing a first transmit fixed frequency output signal;

feeding back an output signal of a transmit feedback loop within the transmit phase lock loop circuit for providing an input to a transmit mixer;

mixing the frequencies of a second transmit input signal within the transmit phase lock loop circuit and said feedback signal for providing an output signal frequency of said transmit mixer;

dividing said output signal frequency of said transmit mixer by a second transmit factor for providing a second transmit fixed frequency output signal;

comparing said first transmit fixed frequency output signal with said second transmit fixed frequency output signal for determining a differential transmit fixed frequency output signal; and providing a transmit voltage controlled oscillator output signal with a transmit oscillator output signal frequency controlled by an output voltage signal from a transmit phase comparator and by said plurality of half cycles of said amplitude modulated signal, said transmit voltage controlled oscillator output signal being a frequency modulated signal having a center frequency generated by the transmit phase lock loop circuit.

12. A method for decoding digital data from a frequency modulated signal comprising the steps of:

receiving a frequency modulated signal from a transmission cable for providing a frequency modulated receive signal;

filtering said frequency modulated receive signal for providing a filtered frequency modulated receive signal;

mixing said filtered frequency modulated receive signal with a main oscillator output signal frequency of a main voltage controlled oscillator for providing a first differential signal, said first differential signal being a first receiver mixer signal;

filtering said first receiver mixer signal for providing a filtered first receiver mixer signal of approximately 45.05 MHz;

mixing said filtered first receiver mixer signal with a receiver oscillator signal from a receiver oscillator for providing a second differential signal, said second differential signal being a second receiver mixer signal;

filtering said second receiver mixer signal for providing a filtered second receiver mixer signal of approximately 16.9 MHz;

amplifying said filtered second receiver mixer signal for providing an amplified second receiver mixer signal, said amplified second receiver mixer signal being an amplitude modulated signal of approximately 16.9 MHz;

detecting and amplifying said amplitude modulated signal for providing a carrier detect signal to a support element for preventing the distortion of data on said transmission cable;

receiving and inverting a lower half of each of a plurality of cycles of said amplitude modulated signal present at an input terminal of a data decoder for providing a plurality of half cycles having two bits of data per cycle;

detecting a zero level of any of said plurality of half cycles of said amplitude modulated signal for providing a zero level detector output pulse when a signal input to a zero level detector is encoded with a logical zero;

detecting a one level of any of said plurality of half cycles of said amplitude modulated signal for providing a one level detector output pulse when a signal input to a one level detector is encoded with a logical one;

generating a plurality of clock pulses for providing time sequencing to the data decoder;

resetting a first counter to zero with each zero level detector output pulse for providing a first counter output pulse following a first predetermined number of clock pulses and at the peak of each of said plurality of half cycles present at said input terminal of the data decoder;

waiting a period of time after providing said first counter output pulse approximately equal to a quarter cycle of said amplitude modulated signal until said first counter is reset to zero by said zero level detector output pulse;

latching a voltage signal present at an output terminal of said one level detector for providing an output voltage in a digital format when said first counter provides an output pulse at the peak of each of said plurality of half cycles of said amplitude modulated signal;

resetting a second counter to zero with a reset input pulse from said first counter for providing a second counter output pulse following a second predetermined number of clock pulses; and transmitting said second counter output pulse to said support element for signaling said support element that said voltage signal at said output terminal of said one level detector is present.

13. A method for decoding digital data from an amplitude modulated signal comprising the steps of:

receiving an amplitude modulated signal from a translating means for decoding said amplitude modulated signal;

inverting a lower half of each of a plurality of cycles of said amplitude modulated signal present at an input terminal of a data decoder for providing a plurality of half cycles having two bits of data per cycles;

detecting a zero level of any of said plurality of half cycles of said amplitude modulated signal for providing a zero level detector output pulse when a signal input to a zero level detector is encoded with a logical zero;

detecting a one level of any of said plurality of half cycles of said amplitude modulated signal for providing a one level detector output pulse when a signal input to a one level detector is encoded with a logical one;

generating a plurality of clock pulses having a clock frequency sixteen times the data rate for providing time sequencing to the data decoder;

resetting a first counter to zero with each zero level detector output pulse for providing a first counter output pulse following a first predetermined number of clock pulses and at the peak of each of said plurality of half cycles present at said input terminal of the data decoder, said first predetermined number of clock pulses being eight;

waiting a period of time after providing said first counter output pulse approximately equal to a quarter cycle of said amplitude modulated signal until said first counter is reset to zero by said zero level detector output pulse;

latching a voltage signal present at an output terminal of said one level detector for providing an output voltage in a digital format when said first counter provides an output pulse at the peak of each of said plurality of half cycles of said amplitude modulated signal;

resetting a second counter to zero with a reset input pulse from said first counter for providing a second counter output pulse following a second predetermined number of clock pulses, said second predetermined number of clock pulses being less than sixteen; and transmitting said second counter output pulse to a support element for signaling said support element that said voltage signal at said output terminal of said one level detector is present.

14. A method for encoding digital data into an amplitude modulated signal comprising the steps of:

generating pulses for clocking a pair of counters for representing a binary value;

incrementing said binary value of a first of said pair of counters by one for each generated pulse for providing a first binary output pulse which is zero for each sixteenth generated pulse;

providing a second binary output pulse from a second of said pair of counters for pulsing a flip-flop circuit;

providing a flip-flop output signal responsive to said second binary output pulse for changing state with each of said second binary output pulse;

receiving a plurality of digital data by a memory storage device from a support element and said first binary output signal from said first of said pair of binary counters for addressing a plurality of memory locations;

stepping through a sequence of said memory locations within said memory storage device wherein a prearranged sequence of memory output signals are generated such that said sequence of memory output signals is one of two sequences selected by the plurality of digital data received by said memory storage device;

inverting said memory output signal for providing an inverted output signal when said flip-flop output signal is a logical one, said inverted output signal being the digital complement of said memory output signal;

converting said sequence of memory output signals from said memory storage device to a plurality of voltage output signals for generating a half cycle of an amplitude modulated signal with the amplitude of said half cycle being determined by the plurality of digital data received by said memory storage device; and amplifying and filtering a plurality of said half cycles of the amplitude modulated signal for delivering to a transmitter circuit.

* * * * *